US012365005B2

(12) United States Patent
Ikushima

(10) Patent No.: US 12,365,005 B2
(45) Date of Patent: Jul. 22, 2025

(54) PLANAR LIQUID FILM FORMING METHOD AND PLANAR LIQUID FILM FORMING APPARATUS

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 223 days.

(21) Appl. No.: 17/910,098

(22) PCT Filed: Mar. 1, 2021

(86) PCT No.: PCT/JP2021/007599
§ 371 (c)(1),
(2) Date: Sep. 8, 2022

(87) PCT Pub. No.: WO2021/182146
PCT Pub. Date: Sep. 16, 2021

(65) Prior Publication Data

US 2023/0095269 A1 Mar. 30, 2023

(30) Foreign Application Priority Data

Mar. 11, 2020 (JP) ................................ 2020-041946

(51) Int. Cl.
*B05D 1/26* (2006.01)
*B05C 5/02* (2006.01)
*B05C 11/10* (2006.01)

(52) U.S. Cl.
CPC .............. *B05C 5/027* (2013.01); *B05C 11/10* (2013.01); *B05D 1/26* (2013.01)

(58) Field of Classification Search
CPC ................................ B05D 1/26; B05C 5/027
See application file for complete search history.

(56) References Cited

U.S. PATENT DOCUMENTS 6,709,699 B2 * 3/2004 Ema .................... B05D 3/0254 438/758
11,958,072 B2 * 4/2024 Ikushima .............. G02F 1/1333
(Continued)

FOREIGN PATENT DOCUMENTS

DE 112017002727 T5 2/2019
EP 3056944 A1 8/2016
(Continued)

OTHER PUBLICATIONS

International Search Report dated May 18, 2021, issued in counterpart application No. PCT/JP2021/007599.
(Continued)

*Primary Examiner* — Michael P Wieczorek
(74) *Attorney, Agent, or Firm* — WHDA, LLP

(57) ABSTRACT

Problem: To provide a technology for forming a planar liquid film having less surface unevenness than ever before using a jet-type discharge device.
Solution: Provided is a planar liquid film forming method of forming a planar liquid film on an application target using a jet-type discharge device having a plurality of discharge ports, and an apparatus for implementing the method. In the method, the plurality of discharge ports are arranged on a straight nozzle arrangement line 140, and are arranged with such a distance from one another that globs of a liquid material having landed on the application target can join together to form a linear liquid film. The method includes: a unitary linear liquid film forming step of forming a unitary linear liquid film 404 by discharging the liquid material such that a plurality of liquid globs simultaneously discharged from the plurality of discharge ports have no contact with one another before landing on the application target, and by letting globs of the liquid material having landed join together on the application target; and a specific planar liquid film forming step of forming a specific planar liquid
(Continued)

film 405 from a plurality of unitary linear liquid films 404 by successively executing the unitary linear liquid film forming steps while moving the jet-type discharge device and the application target relative to each other in a direction perpendicular to the nozzle arrangement line 140 so that the plurality of unitary linear liquid films 404 join together.

10 Claims, 9 Drawing Sheets

(56) References Cited

U.S. PATENT DOCUMENTS

2004/0081759 A1 4/2004 Maruyama et al.
2005/0095366 A1 5/2005 Fang et al.
2007/0145164 A1* 6/2007 Ahmadi ................ B05C 5/0275 239/562
2017/0066005 A1* 3/2017 Ikushima .............. B05C 5/0212
2018/0186143 A1 7/2018 DeFillipi et al.
2018/0214903 A1 8/2018 Ikushima
2020/0179974 A1 6/2020 Ikushima
2020/0316637 A1 10/2020 Ikushima

FOREIGN PATENT DOCUMENTS

JP H05-309310 A 11/1993
JP 2003-245596 A 9/2003
JP 2007-167844 A 7/2007
JP 2007-524506 A 8/2007
JP 2008-104998 A 5/2008
JP 2013-052351 A 3/2013
JP 2017-023958 A 2/2017
WO 2015/137271 A1 9/2015
WO WO-2018221432 A1 * 12/2018 ............. B05C 11/10

OTHER PUBLICATIONS

Extended (Supplementary) European Search Report dated Mar. 18, 2024, issued in counterpart EP Application No. 21769000.7. (2 pages).
Office Action dated Oct. 11, 2024, issued in counterpart TW Application No. 110108057, with English translation. (40 pages).

* cited by examiner

[Fig.1]
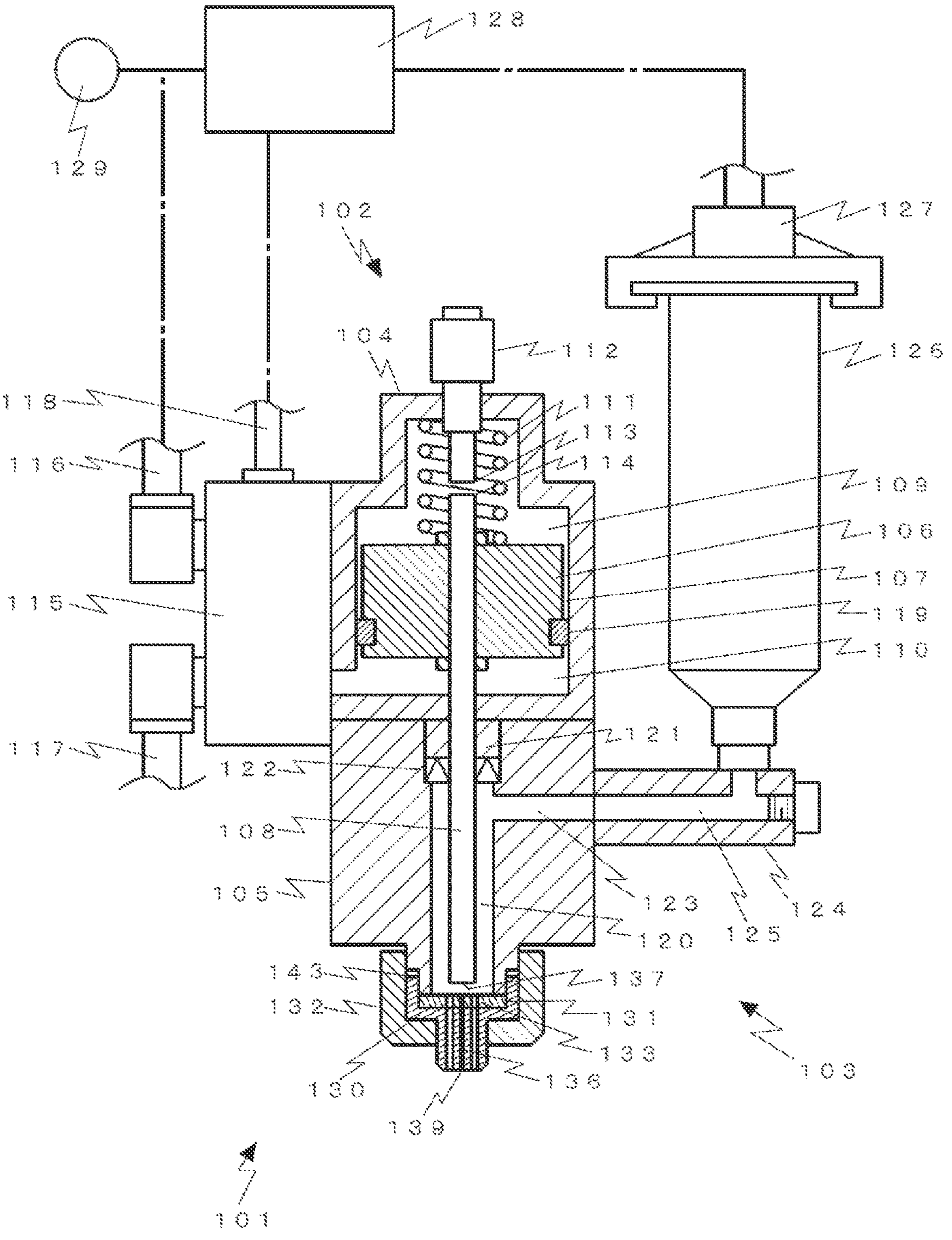

[Fig.2]
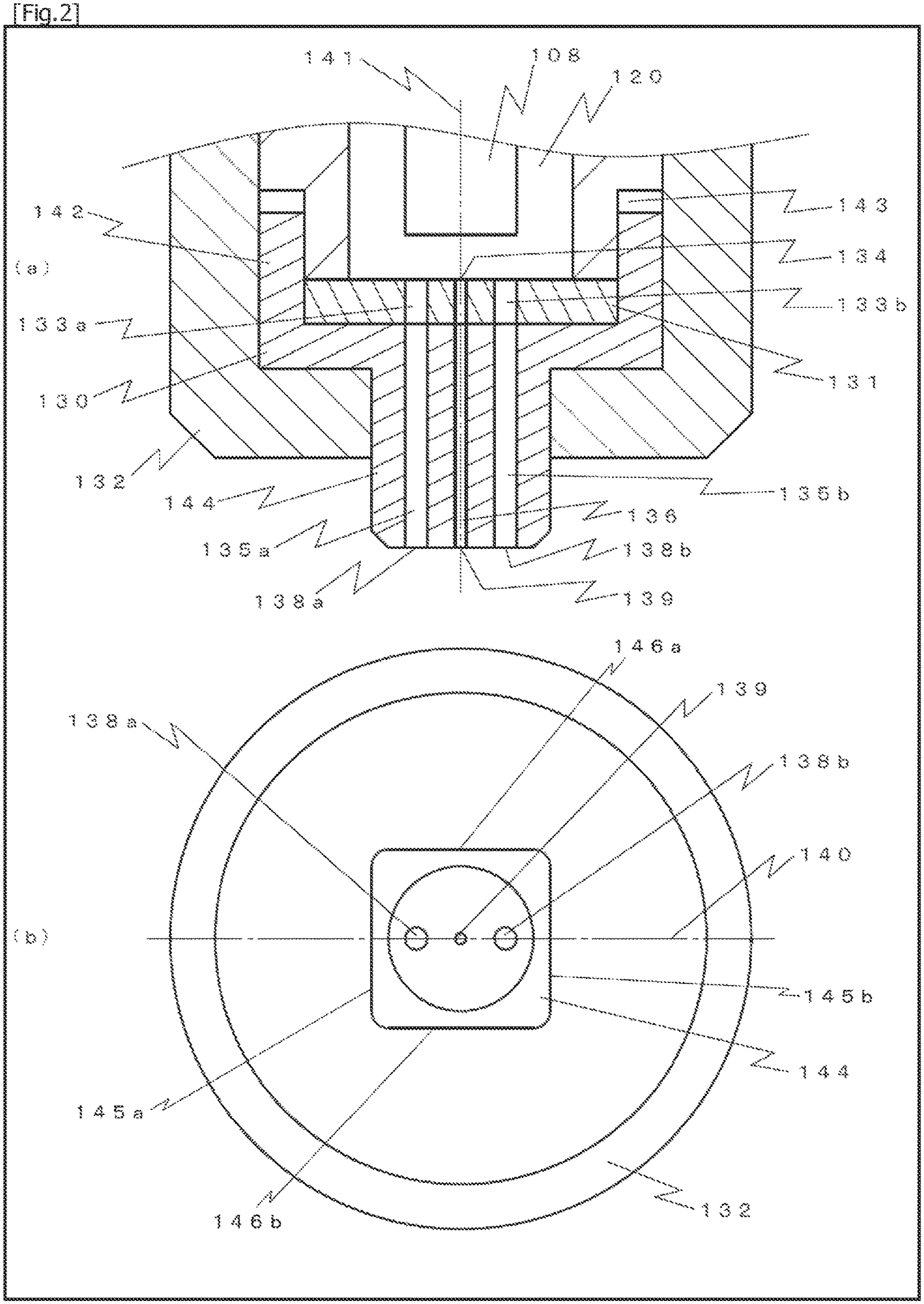

[Fig.3]
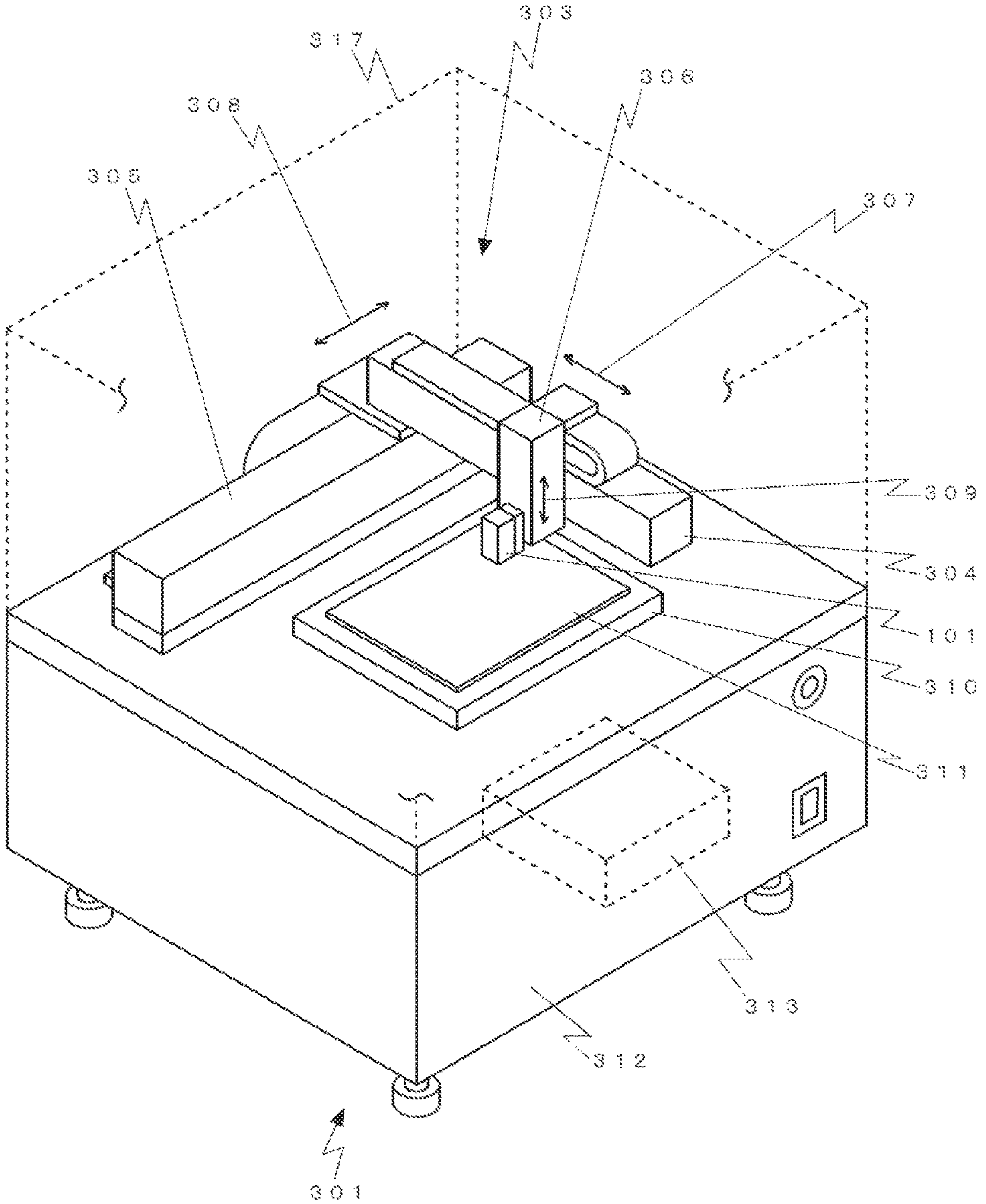

[Fig.4]
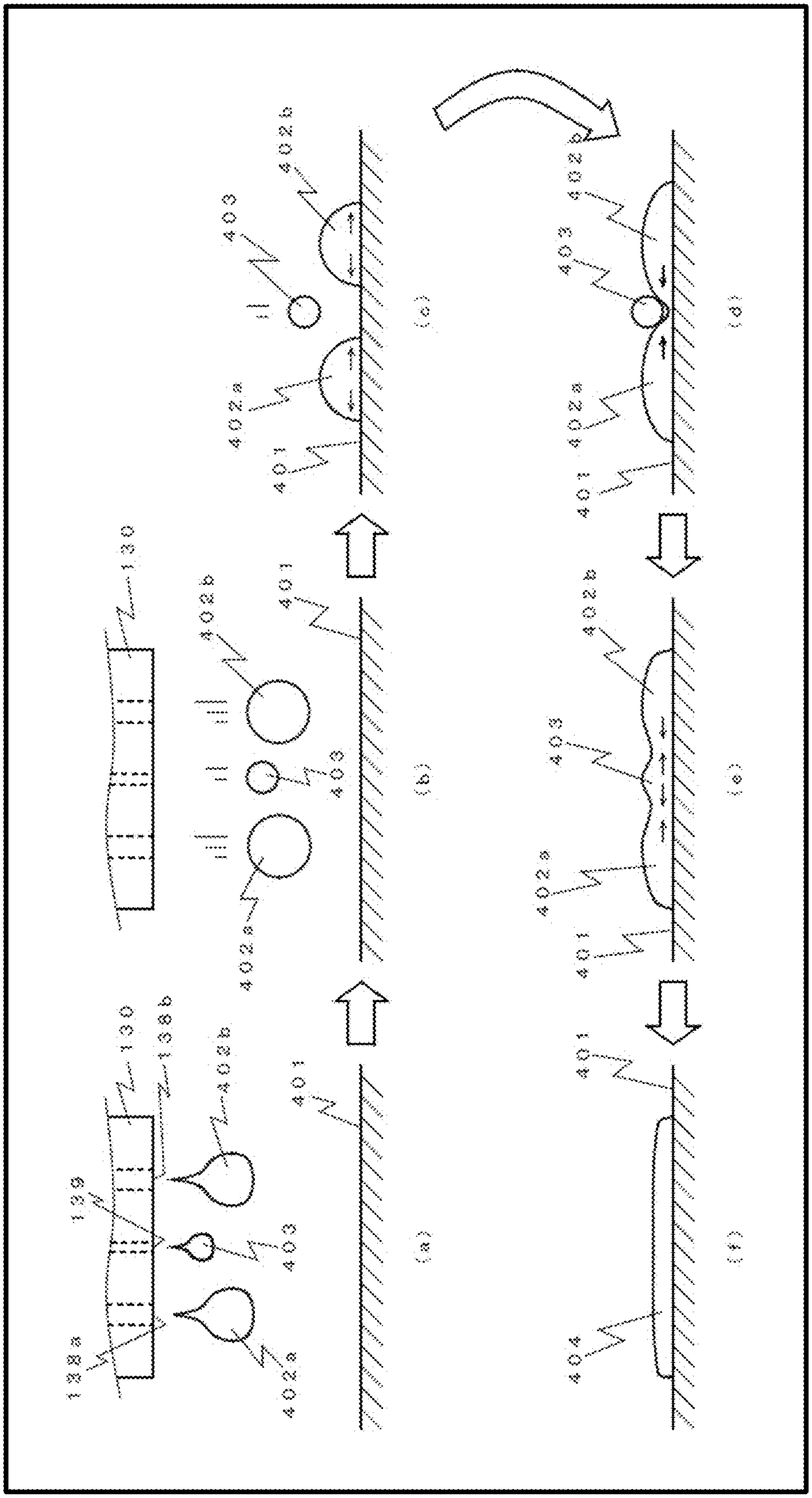

[Fig.5]
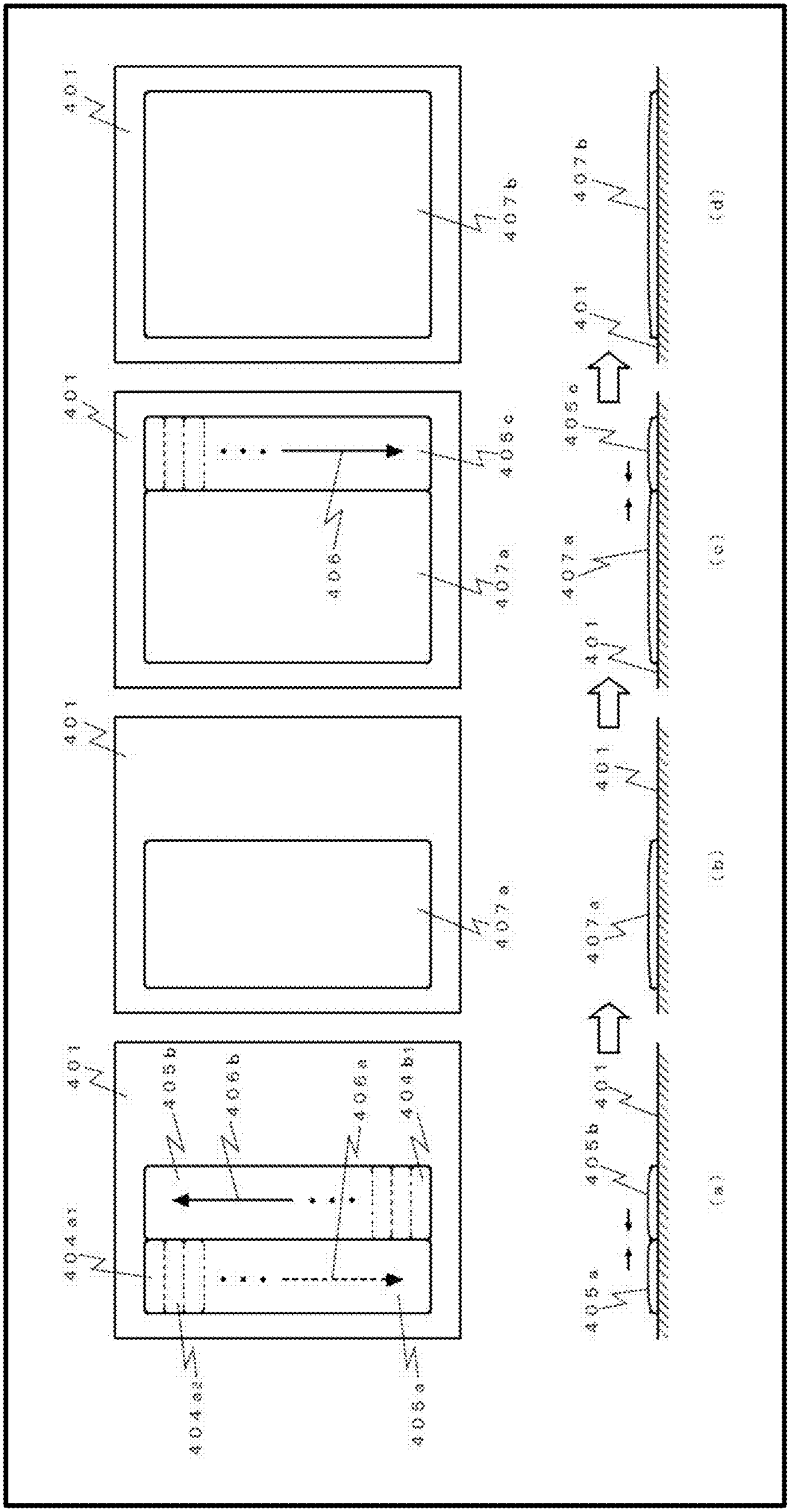

[Fig.6]
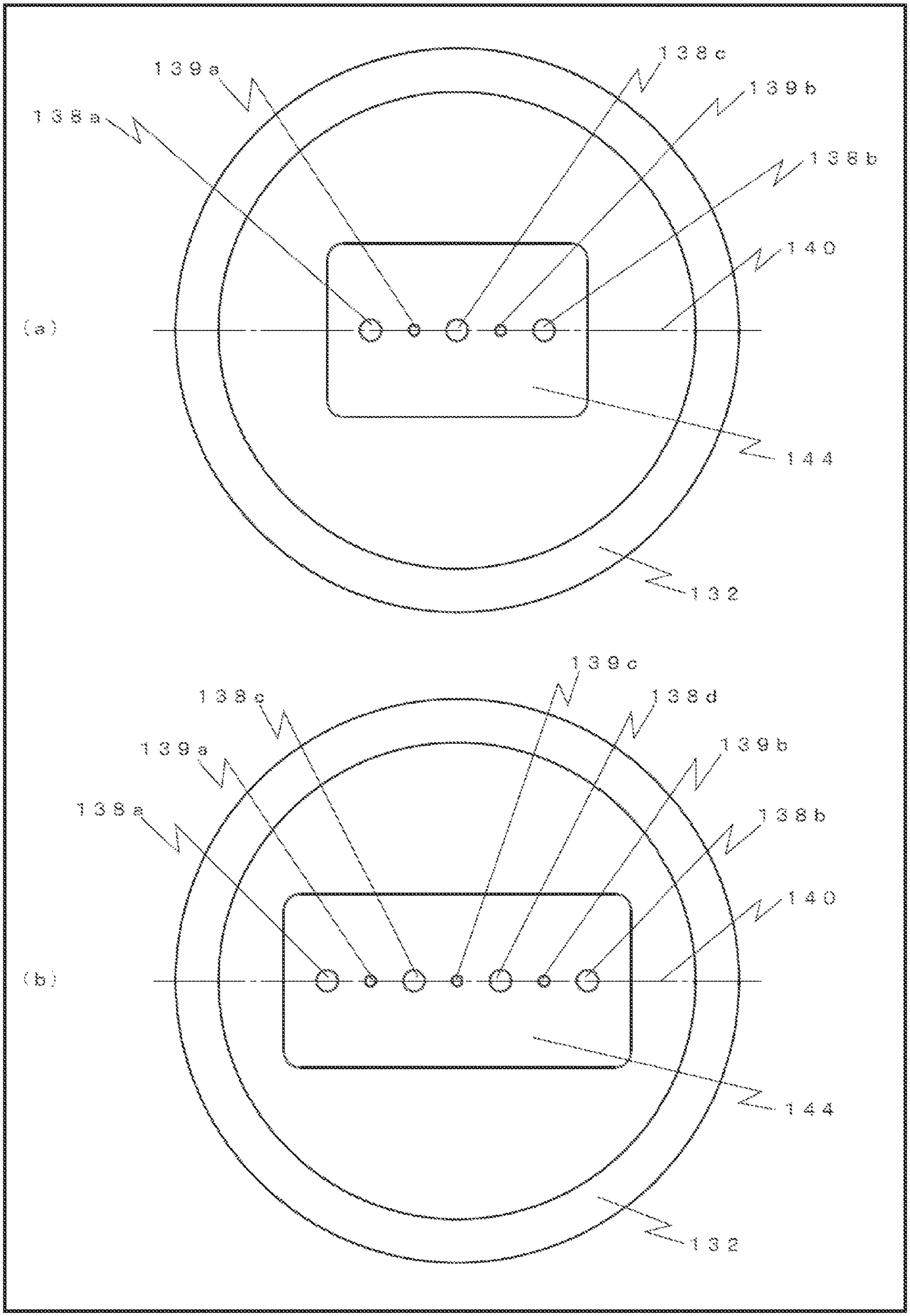

[Fig.7]
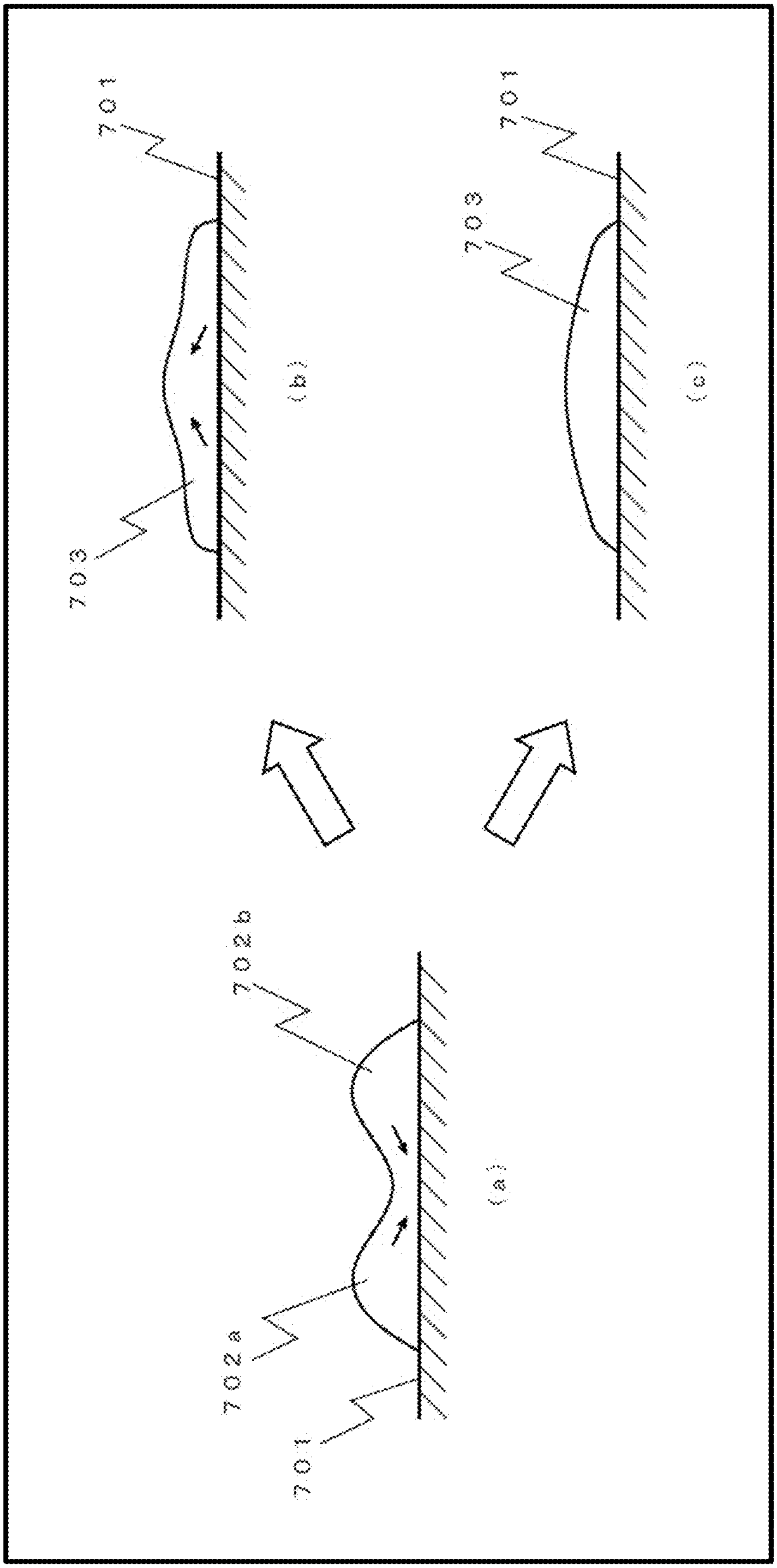

[Fig.8]
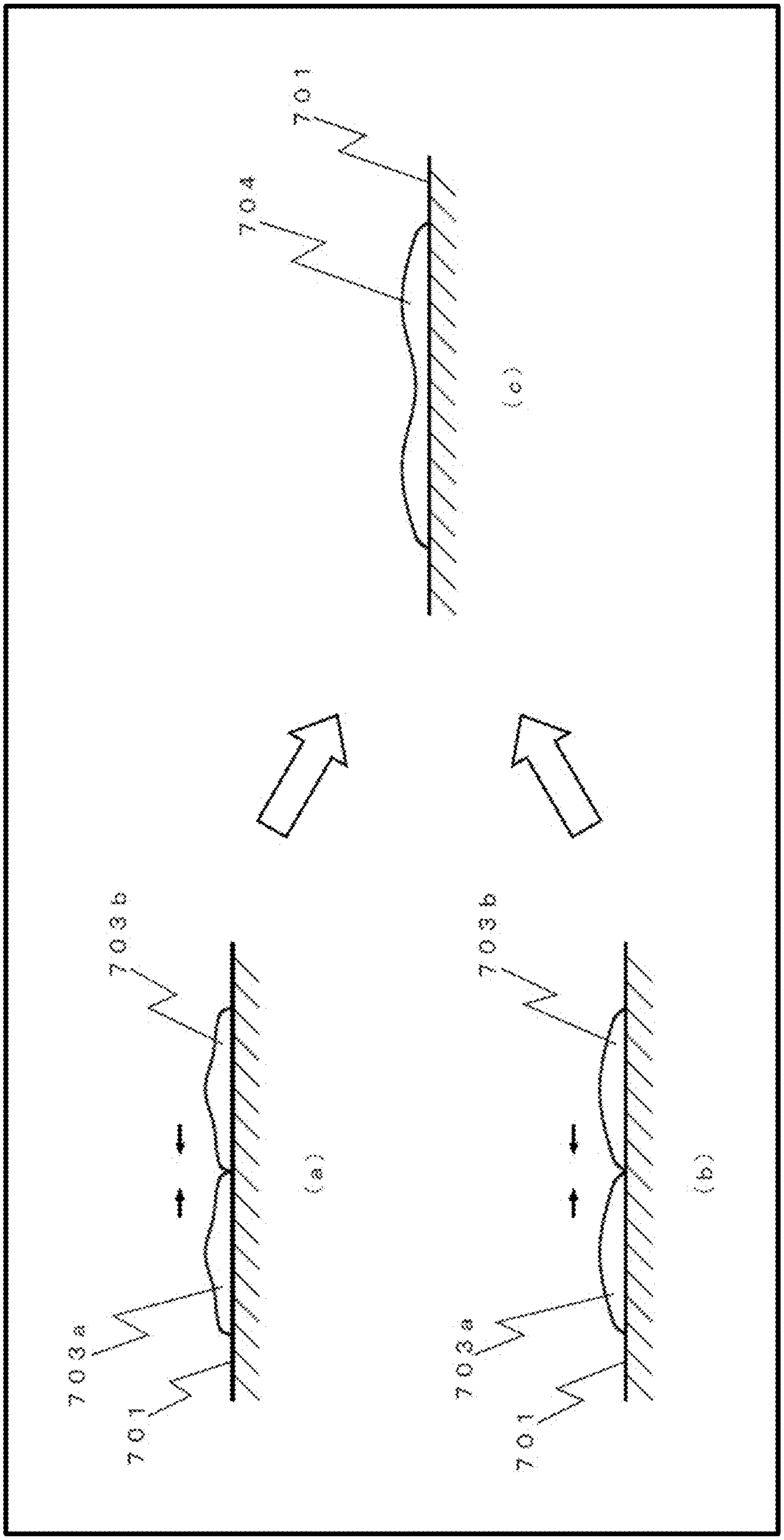

[Fig.9]
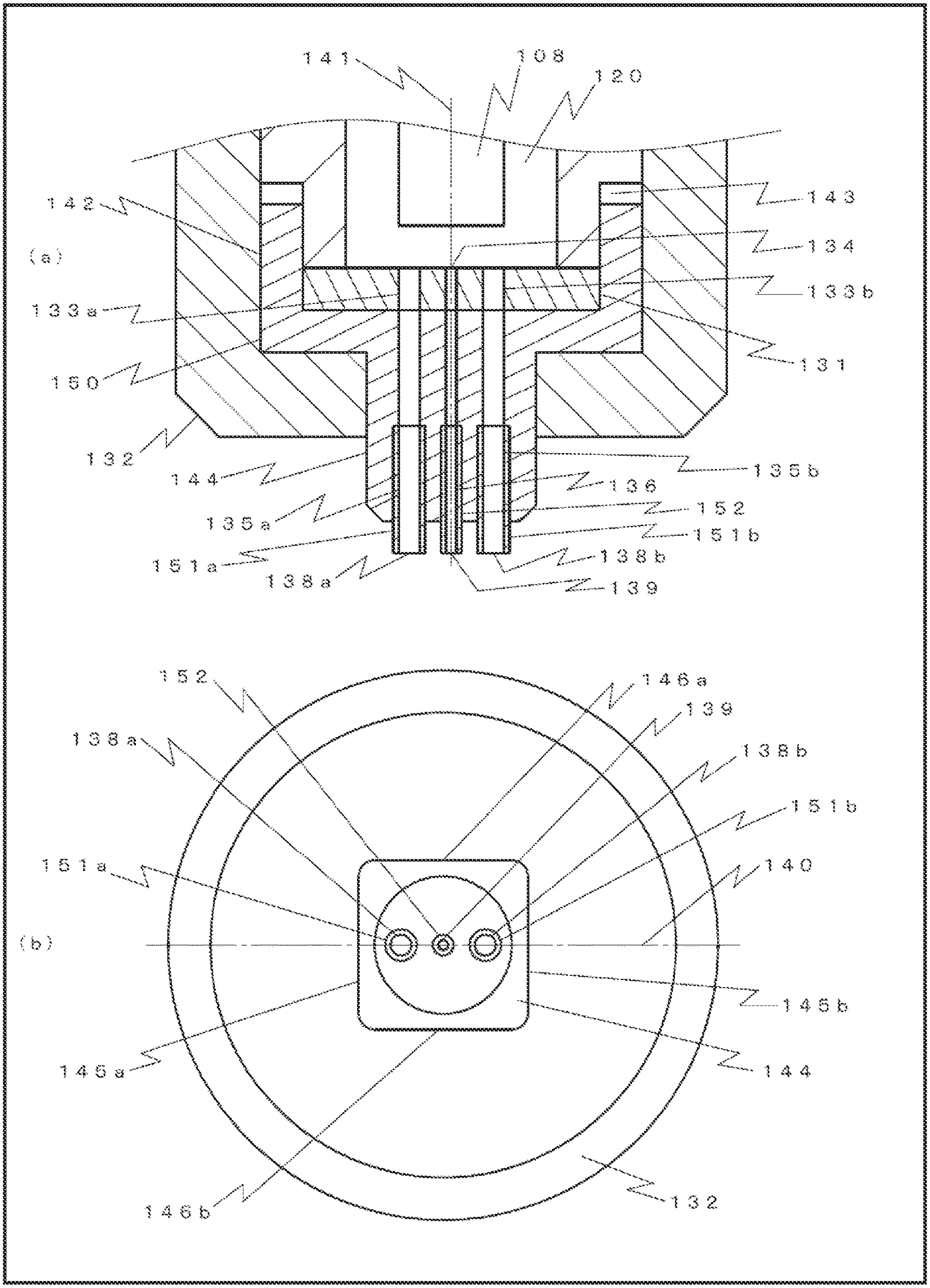

PLANAR LIQUID FILM FORMING METHOD AND PLANAR LIQUID FILM FORMING APPARATUS

TECHNICAL FIELD

The present invention relates to a planar liquid film forming method and a planar liquid film forming apparatus for forming a planar liquid film on an application target.

BACKGROUND ART

There is known a coating process of forming a liquid film in a planar shape by applying a liquid material on a surface of an object.

For example, Patent Document 1 relates to a method of coating for protecting electrical components mounted on a printed circuit substrate from humidity or the like. The method coats a surface of the substrate with a coating material by iterating a step of forming a droplet of the coating material while moving a jetting valve that jets the coating material in a non-contact manner relative to the substrate.

Incidentally, jetting dispensers (jet-type discharge devices) that jet a liquid material toward a substrate have been used to perform line-drawing application. Because it takes longer application time for a jet-type discharge device having a single discharge port to perform the line-drawing application, a jet-type discharge device having a plurality of discharge ports is sometimes used to perform line-drawing application. In Patent Document 2, the applicant proposed an application method of performing high-speed linear application in which a plurality of discharge ports are arranged along a straight nozzle arrangement line and the nozzle arrangement line is aligned with a drawing direction of drawing a line.

However, there is a problem that a cross section of an application line formed by the application method of Patent Document 2 is semicircular or semi-elliptical, and has a large height compared to a width (for example, a height-to-width ratio of the cross section of the application line is almost 1).

Thus, in Patent Document 3, the applicant proposed an application method that enables line-drawing application to achieve a cross-sectional shape with a small height-to-width ratio. Patent Document 3 relates to the method of performing the line-drawing application that achieves a cross-sectional shape that has a smaller height relative to the width. The method includes, while moving a jet-type discharge device and an application target relative to each other in a direction perpendicular to a straight line on which a plurality of discharge ports are arranged, successively discharging a liquid material from the plurality of discharge ports, and letting globs of the liquid material join together, thereby forming a linear liquid film.

PRIOR ART LIST

Patent Document

Patent Document 1: Japanese National Publication of International Patent Application No. 2007-524506

Patent Document 2: International Publication No. 2015/137271

Patent Document 3: International Publication No. 2018/221432

SUMMARY OF THE INVENTION

Problems to be Solved by the Invention

These days, it is desired to form a liquid film in a planar shape using a liquid material with relatively high viscosity. However, using the liquid material with relatively high viscosity has a problem that no conventional spray device can spray such a liquid material as expected. In this respect, jet-type discharge devices can discharge droplets of the liquid material with relatively high viscosity.

However, the device according to Patent Document 1 described above has a single discharge port, and is thus not suitable for efficiently forming a planar liquid film over a wide area. Using the device according to Patent Document 2 or 3 described above to form a liquid film in a planar shape has a problem that a smooth surface with less unevenness is not obtained and required accuracy such as flatness cannot be satisfied. Such a problem is particularly pronounced with highly viscous materials such as silicon resin, urethane resin, and epoxy resin.

Therefore, an object of the present invention is to provide a planar liquid film forming method and a planar liquid film forming apparatus for forming a planar liquid film having a surface with less unevenness than ever before.

Means for Solving the Problems

The inventor initially tried planar application using the device according to Patent Document 3. FIG. 7 shows a diagram for explaining a process of forming a linear liquid film using the device according to Patent Document 3. As shown in FIG. 7(*a*), when a plurality of droplets 702*a*, 702*b* (two, in this example) having landed on an application target 701 come in contact with each other and start to join together, the droplets (702*a*, 702*b*) flow toward each other and bump into each other near the midpoint. Then, as shown in FIG. 7(*b*), the bumped flow sometimes causes elevation near the midpoint. As a result, a cross section of a linear liquid film 703 may have a mountain-like convex shape. As shown in FIG. 7(*c*), even when the bumped flow does not cause elevation near the midpoint, the cross-sectional shape of the linear liquid film 703 is nearly semi-elliptical. Multiple iterations of the formation of the linear liquid film 703 having such a cross-sectional shape in FIG. 7 to form a planar liquid film causes a problem that the planar liquid film has a surface with unacceptable unevenness. This will be described with reference to FIG. 8.

FIG. 8 shows a diagram for explaining a process of forming a planar liquid film 704 by forming a plurality of linear liquid films 703 (two, in this example) adjacent to each other using the device according to Patent Document 3. As shown in FIG. 8(*a*), when the plurality of linear liquid films 703*a*, 703*b* (two, in this example) applied on the application target 701 and each having an elevation portion came in contact with each other and joined together, the planar liquid film 704 resulting from the joining together had unacceptable unevenness on the surface as shown in FIG. 8(*c*). As shown in FIG. 8(*b*), the same applies to the case where the linear liquid films 703*a*, 703*b* each having a nearly semi-elliptical cross-sectional shape join together.

Then, as a result of trial and error, the inventor conceived an idea of discharging a small amount of a liquid material on a depressed portion of a linear liquid film formed by joining together, which led to the technical idea of the present invention. That is, the present invention is configured with the following technical means.

A planar liquid film forming method of the present invention is a method of forming a planar liquid film on an application target using a jet-type discharge device having a plurality of discharge ports, wherein the plurality of discharge ports are arranged on a straight nozzle arrangement line, and are arranged with such a distance from one another that globs of a liquid material having landed on the application target can join together to form a linear liquid film, the method including: a unitary linear liquid film forming step of forming a unitary linear liquid film by discharging the liquid material such that a plurality of liquid globs simultaneously discharged from the plurality of discharge ports have no contact with one another before landing on the application target, and by letting globs of the liquid material having landed join together on the application target; and a specific planar liquid film forming step of forming a specific planar liquid film from a plurality of unitary linear liquid films by successively executing the unitary linear liquid film forming steps while moving the jet-type discharge device and the application target relative to each other in a direction perpendicular to the nozzle arrangement line so that the plurality of unitary linear liquid films join together.

The planar liquid film forming method may include a joined planar liquid film forming step of forming a joined planar liquid film from a plurality of specific planar liquid films by executing the specific planar liquid film forming step multiple times to form the plurality of specific planar liquid films adjacent to one another in a direction of the nozzle arrangement line so that the plurality of specific planar liquid films join together.

In the planar liquid film forming method, the joined planar liquid film forming step may include repeatedly performing a movement of the jet-type discharge device and the application target in a first direction to form a specific planar liquid film and then in a second direction that is opposite to the first direction to form a subsequent specific planar liquid film.

In the planar liquid film forming method, the joined planar liquid film forming step may include forming the joined planar liquid film by letting differently shaped specific planar liquid films join together.

In the planar liquid film forming method, the joined planar liquid film may have surface unevenness with a height of one-tenth or less of a thickness of the joined planar liquid film.

In the planar liquid film forming method, the plurality of discharge ports may include: a leftmost large-diameter discharge port arranged on a left end; a rightmost large-diameter discharge port arranged on a right end; and a small-diameter discharge port arranged halfway between the leftmost large-diameter discharge port and the rightmost large-diameter discharge port, wherein all of the large-diameter discharge ports may have a same diameter.

In the planar liquid film forming method, the plurality of discharge ports may include: a leftmost large-diameter discharge port arranged on a left end; a rightmost large-diameter discharge port arranged on a right end; at least one large-diameter discharge port arranged between the leftmost large-diameter discharge port and the rightmost large-diameter discharge port; and a plurality of small-diameter discharge ports, wherein all of the large-diameter discharge ports may have a same diameter, wherein each of the small-diameter discharge ports may be arranged halfway between adjacent two of the large-diameter discharge ports.

In the planar liquid film forming method, the unitary linear liquid film forming step may include forming the unitary linear liquid film by causing a small droplet discharged from the small-diameter discharge port to land after a plurality of large droplets discharged from the large-diameter discharge ports landing on the application target.

In the planar liquid film forming method, the plurality of large droplets may be discharged so as to form a depressed portion on a surface when the plurality of large droplets join together on the application target, and the small droplet may be discharged so as to land on the depressed portion.

In the planar liquid film forming method, the diameter of the large-diameter discharge ports may be 1.2 to 2 times larger than a diameter of the small-diameter discharge port.

In the planar liquid film forming method, the large-diameter discharge ports may be arranged at a regular interval, and a distance between adjacent two of the large-diameter discharge ports may be 2 to 12 times larger than the diameter of the large-diameter discharge ports.

In the planar liquid film forming method, the liquid material may have a viscosity of 1000 mPa·s or larger.

A planar liquid film forming apparatus of the present invention includes: a jet-type discharge device; and a relative driving device configured to move the jet-type discharge device and an application target relative to each other, wherein the jet-type discharge device includes: a nozzle having a plurality of discharge ports arranged on a straight nozzle arrangement line; a liquid chamber communicating with the plurality of discharge ports via a plurality of discharge flow paths; a plunger rod that reciprocates in the liquid chamber and is narrower than the liquid chamber; and a control device storing an application program for implementing the planar liquid film forming method.

In the planar liquid film forming apparatus, the nozzle may include: a plurality of discharge tubes having the plurality of discharge ports; and a nozzle member having a tip portion from which the plurality of discharge tubes protrude.

Advantageous Effect of the Invention

According to the present invention, it is possible to form, using a jet-type discharge device, a thin wide planar liquid film having less surface unevenness than ever before and having a nearly rectangular cross-sectional shape.

BRIEF DESCRIPTION OF THE DRAWINGS

FIG. 1 is a partial cross-sectional view of a discharge device according to a first embodiment.

FIG. 2 shows an explanatory view for explaining a nozzle portion of the discharge device according to the first embodiment. (a) shows a cross-sectional view, and (b) shows a bottom view.

FIG. 3 is a schematic perspective view of an application device according to the first embodiment.

FIG. 4 shows a cross-sectional view for explaining a process in which droplets applied by an application method according to the first embodiment form a linear liquid film. (a) shows a time point immediately after the droplets are discharged, (b) shows the droplets flying, (c) shows a time point when large droplets land, (d) shows a time point when a small droplet comes in contact with the large droplets, (e) shows the droplets in the middle of joining together, and (f) shows a time point when the droplets have formed a liquid film.

FIG. 5 shows an explanatory diagram for explaining a process in which specific planar liquid films applied by the application method according to the first embodiment form a joined planar liquid film, and shows a plan view in the upper row and a cross-sectional view in the lower row. (a) shows a scene when an additional specific planar liquid film is formed, (b) shows a scene when specific planar liquid films join together to form a joined planar liquid film, (c) shows a scene when a further additional specific planar liquid film is formed, and (d) shows a scene when the further additional specific planar liquid film joins to form a joined planar liquid film.

FIG. 6 shows a bottom view for explaining a variation of the nozzle. (a) shows a case of three large-diameter discharge ports, and (b) shows a case of four large-diameter discharge ports.

FIG. 7 shows a cross-sectional view for explaining a process in which droplets applied by a method according to a related art form a linear liquid film. (a) shows a time point when two droplets start to join together, (b) shows a time point when the two droplets join together to form a protruded shape, and (c) shows a time point when the two droplets join together to form a semi-elliptical shape.

FIG. 8 shows a cross-sectional view for explaining a process in which linear liquid films applied by the method according to the related art form a planar liquid film. (a) shows a time point when two linear liquid films have been applied to have a protruded cross section, (b) shows a time point when two linear liquid films have been applied to have a semi-elliptical cross section, and (c) shows a time point when the two linear liquid films join together to form a planar liquid film.

FIG. 9 shows an explanatory view for explaining a nozzle portion of a discharge device according to a second embodiment. (a) shows a cross-sectional view, and (b) shows a bottom view.

MODE FOR CARRYING OUT THE INVENTION

Embodiments of the present invention will be described below. Note that a jet-type discharge device described in the Specification refers to a discharge device that causes a tip portion of a plunger rod (valve element), which is disposed in a liquid chamber communicating with a nozzle and is narrower than the liquid chamber, to move forward and then stop suddenly for applying inertial force to a liquid material to discharge the liquid material.

First Embodiment (1) Discharge Device

As shown in FIG. 1, a discharge device 101 of this embodiment mainly includes a driving unit 102 that drives a rod 108 in a vertical direction, and a discharge unit 103 from which a liquid material is discharged by action of the driven rod 108.

The driving unit 102 includes a driving unit body 104 having an inner space 107. The inner space 107 houses a piston 106 inside, where the piston 106 can slide in the vertical direction. The rod 108 is fixed to the piston 106. A shape of the rod 108 is not limited to the illustrated shape, and may have a hemispherical or tapered tip, for example. The inner space 107 is segmented by the piston 106 into a spring chamber 109 and an air chamber 110. The spring chamber 109 is provided above the piston 106, and houses a spring 111 for driving the rod 108 downward. As the spring 111, for example, a helical compression spring, an air spring, or a flat spring can be used. At a top of the spring chamber 109, a stroke adjustment screw 112 is provided for controlling travel of the rod 108 and adjusting a stroke that is a travel distance. The stroke is adjusted by changing a distance between a lower end 113 of the stroke adjustment screw 112 and an upper end 114 of the rod 108.

The air chamber 110 is provided below the piston 106. Compressed air for driving the rod 108 upward flows into the air chamber 110. The compressed air flows into the air chamber 110 from a compressed air source 129 through an air supply tube 116 via a switching valve 115. The compressed air flows out of the air chamber 110 through an air ejection tube 117 via the switching valve 115. As the switching valve 115, for example, a solenoid valve or a fast-response valve is used. A control device 128 connected thereto by a control line 118 can control opening and closing of the switching valve 115. In order to prevent the compressed air flowing into the air chamber 110 from flowing out to the spring chamber 109, a seal member 119 is provided on a lateral side of the piston 106.

The discharge unit 103 includes a discharge unit body 105 having a liquid chamber 120. A lower portion of the rod 108 is inserted into the liquid chamber 120. A lower end portion 137 of the rod is moved forward and then stopped suddenly, which applies inertial force to the liquid material to discharge a plurality of droplets. At this time, the lower end portion 137 of the rod may come in contact with a wall surface of the liquid chamber 120. Alternatively, there may be provided a mechanism for stopping the forward movement of the rod 108 at a desired position. An inner diameter of the liquid chamber 120 is sufficiently larger than a diameter of the rod 108 located in the liquid chamber 120 so that the rod 108 can vertically move without contact between a lateral surface of the rod 108 and an inner surface of the liquid chamber 120. At a top of the liquid chamber 120, there is provided an insertion hole 121 through which the rod 108 is inserted. A seal member 122 is provided on a lower portion of the insertion hole 121 to prevent the liquid material from leaking from the liquid chamber 120 to the driving unit 102. In a lateral side of the liquid chamber 120, there is provided a supply flow path 123 via which the liquid chamber 120 and a reservoir 126 holding the liquid material communicate with each other. In this embodiment, the reservoir 126 is attached to an extended portion 124 provided on a lateral side of the discharge unit body 105, and communicates with the supply flow path 123 via a flow path 125 provided inside the extended portion 124. Compressed air for feeding the liquid material under pressure is adjusted to have a desired pressure by the control device 128, and is then supplied to the reservoir 126 through an adapter tube 127. The liquid material flows from the reservoir 126 through the flow path 125 provided inside the extended portion 124 via the supply flow path 123 into the liquid chamber 120. A valve seat 131 and a nozzle member 130 are detachably fixed to a bottom of the liquid chamber 120 with a nozzle fixture 132. This allows for timely exchange of a worn valve seat 131 in a case of the jet-type discharge device having a seating-type valve element.

The nozzle member 130 and the valve seat 131 will be described in detail with reference to FIG. 2.

The valve seat 131 of this embodiment has two large-diameter communication holes (133*a*, 133*b*) and one small-diameter communication hole 134 penetrating therethrough. The large-diameter communication holes (133*a*, 133*b*) communicate with the liquid chamber 120 and below-described large-diameter discharge flow paths (135*a*, 135*b*) of the nozzle member 130, and the small-diameter communication hole 134 communicates with the liquid chamber 120 and a below-described small-diameter discharge flow path 136 of the nozzle member 130. The valve seat 131 is fixed in a sandwiched manner between a lower end portion of the liquid chamber 120 and the nozzle member 130. Note that the liquid chamber 120 and each discharge flow path (135*a*, 135*b*, 136) of the nozzle member 130 may directly communicate with each other without the valve seat 131.

The nozzle member 130 of this embodiment includes a cylindrical trunk portion 142, and a tip portion 144 extending downward from a lower end of the trunk portion 142. An upper end of the trunk portion 142 is shaped to fit a stepped portion 143 provided in the lower end portion of the liquid chamber 120. In addition, an inside of the trunk portion 142 is recessed to hold the valve seat 131. The two large-diameter discharge flow paths (135*a*, 135*b*) and the small-diameter discharge flow path 136 are provided parallel to one another in the tip portion 144. An exterior surface of the tip portion 144 may be coated with a water-repellent material or subjected to water-repellent surface treatment. Making the tip portion 144 water-repellent to prevent extra liquid material from adhering to the tip portion 144 allows for avoiding problems that will occur in successive application.

Upper ends of the two large-diameter discharge flow paths (135*a*, 135*a*) communicate with the two large-diameter communication holes (133*a*, 133*b*) of the valve seat 131, respectively, and an upper end of the small-diameter discharge flow path 136 communicates with the small-diameter communication hole 134 of the valve seat 131. Meanwhile, lower ends of the two large-diameter discharge flow paths (135*a*, 135*b*) constitute two large-diameter discharge ports (138*a*, 138*b*) communicating with the outside, respectively, and a lower end of the small-diameter discharge flow path 136 constitutes one small-diameter discharge port 139 communicating with the outside. Each discharge flow path (135*a*, 135*b*, 136) is constituted by a columnar flow path having a uniform diameter from the upper end to the lower end. For example, a diameter of the large-diameter discharge flow paths 135*a*, 135*b* is set in a range of 0.35 to 0.70 mm, and a diameter of the small-diameter discharge flow path 136 is set in a range of 0.25 to 0.35 mm. In other words, the diameter of the large-diameter discharge flow paths 135*a*, 135*b* is set 1.2 to 2 times larger than the diameter of the small-diameter discharge flow path 136. However, none of the settings is limited to the above-described range, and may be changed appropriately depending on properties of a liquid material to be used or a desired application shape.

The two large-diameter discharge ports (138*a*, 138*b*) are positioned symmetrically about a central axis line 141, and the small-diameter discharge port 139 is positioned coaxially with the central axis line 141. That is, the discharge ports (138*a*, 138*b*, 139) are arranged on a line 140 (hereinafter, this line is referred to as a nozzle arrangement line 140) crossing the central axis line 141. Herein, a distance between the two large-diameter discharge ports (138*a*, 138*b*) (a distance between a rightmost end of the left large-diameter discharge port 138*a* and a leftmost end of the right large-diameter discharge port 138*b*) is set to at least such a distance that a plurality of droplets simultaneously discharged from the discharge ports (138*a*, 138*b*, 139) do not join together in the air and do not form a single droplet. For example, the distance is set 2 to 12 times larger than the diameter of the large-diameter discharge ports 138*a*, 138*b*. Moreover, conditions are set in a control device 313 which cause two large droplets (402*a*, 402*b*) to be discharged from the large-diameter discharge ports (138*a*, 138*b*) and join together on an application target 401, taking a viscosity of the liquid material, a distance between the nozzle member 130 and the application target 401, and the like into consideration. In this regard, it is preferable to set the conditions to cause a depressed portion to be formed on a surface when the two large droplets (402*a*, 402*b*) discharged from the large-diameter discharge ports (138*a*, 138*b*) join together.

The small-diameter discharge port 139 is located halfway (that is, just at a midpoint) between the two large-diameter discharge ports (138*a*, 138*b*) for a reason described below (see FIG. 4). In other words, the small-diameter discharge port 139 is preferably positioned equidistant from both of the large-diameter discharge ports (138*a*, 138*b*).

In this embodiment, as shown in FIG. 2(*b*), the tip portion 144 of the nozzle member 130 is substantially rectangular as viewed from the bottom, and has tip-portion first aspect sides (145*a*, 145*b*), and tip-portion second aspect sides (146*a*, 146*b*) parallel to the nozzle arrangement line 140.

In this embodiment, the numbers of the large-diameter discharge ports 138 and the small-diameter discharge port 139 are two and one, respectively. But the numbers of large-diameter discharge ports 138 and small-diameter discharge ports 139 are not limited thereto. The number of large-diameter discharge ports 138 may be three or more and the number of small-diameter discharge ports 139 may be two or more. For example, FIG. 6(*a*) shows a case of three large-diameter discharge ports 138 and two small-diameter discharge ports 139. FIG. 6(*b*) shows a case of four large-diameter discharge ports 138 and three small-diameter discharge ports 139. In each case, the discharge ports (138, 139) are arranged on the nozzle arrangement line 140. In each case, the discharge ports (138, 139) communicate with the liquid chamber 120 via discharge flow paths having same diameters as the respective discharge ports. Each small-diameter discharge port 139 is positioned equidistant from both of two adjacent large-diameter discharge ports 138. In addition, the discharge ports (138, 139) are preferably arranged at a regular interval. The arrangement at a regular interval can yield a specific planar liquid film 405 with less surface unevenness. Increasing the number of discharge ports as illustrated in FIG. 6 leads to an increase in an area of a liquid film formed per a single application process, allowing the application process to be performed fewer times for planer application compared to the configuration of FIG. 2. In each illustrated variation, the plurality of large-diameter discharge ports 138 have a same diameter, and the plurality of small-diameter discharge ports 139 have another same diameter. In each illustrated variation, the discharge ports (138, 139) are arranged on the nozzle arrangement line 140. It is not to say that even a slight arrangement deviation of the discharge ports (138, 139) is unacceptable to achieve the advantageous effects of the present invention. A mode where a plurality of discharge ports are arranged substantially on a straight line also falls within the technical scope of the present invention.

(2) Discharge Operation

The discharge device 101 of this embodiment is a discharge device that discharges and flies a plurality of droplets simultaneously from the plurality of discharge ports (138*a*, 138*b*, 139) by vertically moving the rod 108 to move forward the tip 137 of the rod 108 toward the communication holes (133*a*, 133*b*, 134) of the valve seat communicating with the discharge flow paths (135, 136) of the nozzle member 130.

Descriptions for a single operation of discharging the liquid material (three droplets) are given below with respect to the type of the rod 108 coming in contact with the valve seat 131. In an initial state, the rod 108 is in contact with the valve seat 131 so as to close the communication holes (133*a*, 133*b*, 134).

When the control device 128 transmits an operation start signal to the switching valve 115, the valve switches to a flow-in position and the compressed air flows into the air chamber 110. The compressed air causes the piston 106 to move upward while compressing the spring 111, and the lower end portion 137 of the rod 108 accordingly separates from the valve seat 131 and opens the communication holes (133*a*, 133*b*, 134). The rod 108 moves upward until the upper end 114 thereof comes in contact with the lower end 113 of the stroke adjustment screw 112. When an operation end signal is transmitted to the switching valve 115 after a lapse of set time, the valve switches to an ejection position to release the compressed air in the air chamber 110 into the atmosphere. Repulsive force of the spring 111 moves the piston 106 downward, and the lower end portion 137 of the rod 108 accordingly comes in contact with the valve seat 131 and closes the communication holes (133*a*, 133*b*, 134). Then, the liquid material flows out of the lower ends of the discharge flow paths (135*a*, 135*b*, 136), and eventually gets away from the discharge ports (138*a*, 138*b*, 139) in the form of three droplets that are discharged and flied toward the target. The above has described the single liquid material discharge operation of the discharge device in which the rod 108 comes in contact with the valve seat 131.

In the discharge device of the above-described type, an amount of the liquid material to be discharged can be controlled by controlling a travel amount (that is, a stroke amount) of the rod 108, duration of holding the rod 108 at an upper position or a lower position, a pressure of the compressed air supplied to the reservoir 126, and the like. The nozzle member 130 is arranged such that respective central lines of the discharge flow paths (135*a*, 135*b*, 136) are aligned with a vertical line for the discharge operation.

(3) Application Device

As shown in FIG. 3, an application device 301 of this embodiment mainly includes the discharge device 101 that discharges the liquid material, and an XYZ-driving device (relative driving device) 303 that moves the discharge device 101 and a worktable 310, on which an application target 311 is placed, relative to each other.

The XYZ-driving device 303 includes an X-driving device 304, a Y-driving device 305, and a Z-driving device 306 that move the discharge device 101 and the worktable 310 relative to each other in an X-direction 307, a Y-direction 308, and a Z-direction 309, respectively. In this embodiment, the Y-driving device 305 extends in the Y-direction 308 on an upper surface of a housing 312, and the X-driving device 304 extends in the X-direction 307 on the Y-driving device 305. The Z-driving device 306 is provided on the X-driving device 304, and the discharge device 101 is provided on the Z-driving device 306. The worktable 310 is installed on the upper surface of the housing 312 so as to be parallel to the Y-driving device 305 and to be located under the X-driving device 304. This configuration allows the discharge device 101 and the application target 311 on the worktable 310 to move relative to each other in the X-direction 307, the Y-direction 308, and the Z-direction 309. The XYZ-driving device 303 can move the nozzle tip of the discharge device 101 to an arbitrary position over the application target 311 at an arbitrary speed under control of the control device 313. Following devices can be used as the XYZ-driving device 303, for example: a combined device of an electric motor, such as a servomotor or a stepping motor, and a ball screw; a device using a linear motor; and a device using a belt or a chain to transmit power. Note that, in order to adjust an application direction, a θ-axis driving device that rotates the discharge device 101 with respect to a Z-axis may be provided.

The worktable 310 is constituted by a plate member, and has a mechanism (not shown) for fixing the application target 311. Following mechanisms can be used as the fixing mechanism, for example: a mechanism with a plurality of holes leading from an inside of the worktable 310 to its upper surface which sucks and fixes the application target 311 by sucking the air through the holes; and a mechanism that fixes the application target 311 by holding the application target 311 between fixing members and fixing those members to the worktable 310 with fixing means such as screws or the like.

The control device 313 includes a processing device, a storage device, an input device, an output device, and a display device. In this embodiment, the processing device and the storage device are embedded in the control device 313, and the input device, the output device, and the display device are combined into a touch panel (not shown). However, the present invention is not limited to this configuration. A personal computer (PC), a programmable logic controller (PLC), or the like can be used as the processing device and the storage device. A keyboard, a mouse, and a display can be used as the input device, the output device, and the display device. The storage device stores an application program for causing the processing device to execute an application operation described below.

A top of the housing 312, which is provided with the discharge device 101, the XYZ-driving device 303, the worktable 310, and the like, is covered by a cover 317 represented by a dotted line. In FIG. 3, a part of the cover 317 is not drawn for convenience of explanation. Provision of the cover 317 can prevent dust from entering the application device 301, and prevent careless contact between an operator and a moving portion of the XYZ-driving device 303 or the like. Although not illustrated, the cover 317 may have an openable door for the operator to easily access the application device. The touch panel may be provided on the cover 317 so that the application device can also be operated from outside the cover 317.

The application device 301 according to this embodiment may work with a carrier device, not shown, for carrying an application target 401 before application into the application device and carrying the application target 401 after application out of the application device. Such a carrier device includes, for example, a rail constituted by two members extending from an entrance port to an exit port provided in the cover 317, a transmission element that acts to carry the application target 401 along a rail extending direction, a carrier driving device for driving the transmission element, and a lifting and lowering device that lifts and lowers the worktable 310. This lifting and lowering device moves the worktable 310 to a lowered position for carrying the application target 401, and to a lifted position for performing the application work. The application target 401 is sandwiched between the worktable 310 and a retainer plate provided to the rail, and is fixed at the lifted position.

(4) Application Operation

The application device 301 according to this embodiment can apply the liquid material in a planar form with a desired cross-sectional shape (width, height) to the application target 311 by a combination of the operation of the discharge device 101 and the operation of the XYZ-driving device 303.

The nozzle member 130 is attached to the discharge device 101 such that the discharge ports (138*a*, 138*b*, 139) are aligned in a direction perpendicular to a movement direction. In other words, the nozzle member 130 is attached to the discharge device 101 such that the nozzle arrangement line 140 is perpendicular to the movement direction. Then, the discharge device 101 to which the nozzle member 130 is attached as described above is moved while successively performing the discharge operation. The droplets discharged from the discharge ports (138*a*, 138*b*, 139) adhere one-by-one onto the application target 311 and join together to form a unitary linear liquid film 404. Furthermore, the unitary linear liquid film 404 is formed multiple times such that each pair of adjacent long sides of the unitary linear liquid films 404 are in contact with each other, and the unitary linear liquid films 404 join together to form a specific planar liquid film 405. The specific planar liquid film 405 is formed multiple times such that each pair of adjacent long sides of the specific planar liquid films 405 are in contact with each other, and the specific planar liquid films 405 join together to form a joined planar liquid film 407.

Processes of forming a unitary linear liquid film 404, a specific planar liquid film 405, and a joined planar liquid film 407 will be described below. In the Specification, the liquid material flowing out of the discharge ports before being separated from the discharge ports, and a plurality of droplets discharged and then separated from the discharge ports before landing on an application target are both sometimes referred to as "liquid globs".

(4-1) Formation of Unitary Linear Liquid Film 404

First, an example of a process in which droplets applied by the application device 301 according to this embodiment form a unitary linear liquid film 404 will be described with reference to FIG. 4. As shown in FIG. 4(*a*), a plurality of droplets (402*a*, 402*b*, 403) simultaneously discharged from the plurality of discharge ports (138*a*, 138*b*, 139) of the nozzle member 130 are different in size (in volume or weight), which causes a difference in time till landing on the application target 401 or a difference in distance to the application target 401 (FIG. 4(*b*)). That is, two large droplets (402*a*, 402*b*) first land on the application target 401 (FIG. 4(*c*)). Then, a small droplet 403 comes in contact with the two large droplets (402*a*, 402*b*) before or just after the two large droplets (402*a*, 402*b*) come in contact with each other (FIG. 4(*d*)). In other words, the small droplet 403 comes in contact with the two large droplets (402*a*, 402*b*) before the two large droplets (402*a*, 402*b*) completely join together. Since the small-diameter discharge port 139 is arranged halfway between the large-diameter discharge ports (138*a*, 138*b*), the small droplet 403 comes in contact with a depressed portion formed between the two large droplets (402*a*, 402*b*) starting to join together. In other words, the small droplet 403 is discharged onto the depressed portion formed between the two large droplets (402*a*, 402*b*) starting to join together. Then, the small droplet 403 works to stop flow of the two large droplets (402*a*, 402*b*) toward their midpoint during the joining together (FIG. 4(*e*)). In addition, the small droplet 403 makes up, with the liquid, for the midpoint depression formed by the two large droplets (402*a*, 402*b*) joining together. In this way, it is possible to form a unitary linear liquid film 404 having smaller surface unevenness with a thin wide cross-sectional shape (FIG. 4(*f*)) compared to the case where only two large droplets join together (for example, a method according to Patent Document 3). Note that FIG. 4 shows just an imaginary diagram drawn for explanation, and it is naturally supposed that actual droplets, a cross-sectional shape of an actual unitary linear liquid film, and the like may be different from those illustrated in FIG. 4.

(4-2) Formation of Specific Planar Liquid Film 405

A specific planar liquid film 405 is formed by successively forming a plurality of unitary linear liquid films 404 while relatively moving the discharge device 101 in a direction perpendicular to the nozzle arrangement line 140 (for example, a direction of an arrow 406 shown in the plan view in the upper row of FIG. 5) and by letting the plurality of unitary linear liquid films 404 join together. In other words, the specific planar liquid film 405 is formed by repeatedly performing, as many times as desired, an operation of forming a unitary linear liquid film 404*n*-Fi adjacently to an n-th unitary linear liquid film $\mathbf{404}_n$ formed on the application target 401 (where n is a natural number). Particularly, as shown in FIG. 5(*a*), when unitary linear liquid films $\mathbf{404}_{a1}$, . . . , $\mathbf{404}_{am}$ are formed adjacently to one another, the unitary linear liquid films $\mathbf{404}_{a1}$, . . . , $\mathbf{404}_{am}$ join together to form a specific planar liquid film 405*a* (where m is a natural number). The applied unitary linear liquid films $\mathbf{404}_{a1}$, . . . , $\mathbf{404}_{am}$ each have a nearly rectangular cross-sectional shape, and are thus able to form, even after joining together, a thin wide specific planar liquid film 405*a* having a nearly rectangular cross-sectional shape and having less surface unevenness.

(4-3) Formation of Joined Planar Liquid Film 407

A joined planar liquid film 407*a* is formed by forming a specific planar liquid film 405*b* adjacently to a specific planar liquid film 405*a* and by letting them join together (FIG. 5(*b*)). In the example of FIG. 5(*a*), a movement direction of the discharge device 101 during formation of the specific planar liquid film 405*a* and a movement direction of the discharge device 101 during formation of the specific planar liquid film 405*b* are opposite, so that a relative movement distance of the discharge device 101 is smallest. That is, upon completion of the formation of the specific planar liquid film 405*a*, the discharge device 101 moves in a direction perpendicular to the movement direction 406*a* taken when the specific planar liquid film 405*a* has been formed, and then successively forms a plurality of unitary linear liquid films 404 while moving in the movement direction 406*b* that is opposite to the movement direction 406*a* to form the specific planar liquid film 405*b*. In a case where two specific planar liquid films 405 that join together yield an intended joined planar liquid film 407, the work ends here. Note that a mode where the movement directions 406*a* and 406*b* are the same unlike the example of FIG. 5 also falls within the technical scope of the present invention In a case where at least three specific planar liquid films 405 that join together yield an intended joined planar liquid film 407, third and subsequent specific planar liquid films 405 are formed. Particularly, as shown in FIG. 5(*c*), a specific planar liquid film 405*c* is formed at a location adjacent to the joined planar liquid film 407*a*, and these films join together to form a joined planar liquid film 407*b* which is a combination of the three specific planar liquid films 405 (FIG. 5(*d*)). In order to obtain the intended final joined planar liquid film 407, additional specific planar liquid films 405 may be successively applied. Even then, the half-processed joined planar liquid film 407 and the newly formed specific planar liquid films 405 each have a nearly rectangular cross-sectional shape, and are thus able to form, even after joining together, the thin wide joined planar liquid film 407 having a nearly rectangular cross-sectional shape and having less surface unevenness than ever before. As described above, a desired joined planar liquid film 407 is formed by applying and forming a specific planar liquid film 405 at least once over a desired coverage. In the example of FIG. 5, the specific planar liquid films and the joined planar liquid films are formed into rectangular shapes in plan view, but the present invention is not limited to such shapes. Specific planar liquid films of various shapes can be formed by controlling the operation of the discharge device and the operation of the XYZ-driving device, and the films can be combined to form a joined planar liquid film in a desired shape to fit a shape of an application target or an applicable area on the application target.

Second Embodiment

A discharge device 101 of a second embodiment will be described with reference to FIG. 9. The discharge device 101 of the second embodiment is similar to the discharge device 101 of the first embodiment in that a driving unit 102 drives a rod 108 in a vertical direction, and a liquid material is discharged from a discharge unit 103 by action of the driven rod 108. The discharge device 101 of the second embodiment is different from the discharge device 101 of the first embodiment in that a nozzle member 150 having discharge tubes (151*a*, 151*b*, 152) is provided. Hereinafter, common constituent elements are denoted by the same reference symbol, and descriptions thereof will be omitted.

The nozzle member 150 of the second embodiment shown in FIG. 9 includes a cylindrical trunk portion 142, and a tip portion 144 extending downward from a lower end of the trunk portion 142. Inside the tip portion 144 of the nozzle member 150, two large-diameter discharge flow paths (135*a*, 135*b*) and a small-diameter discharge flow path 136 are provided. The two large-diameter discharge flow paths (135*a*, 135*b*) have respective lower ends in which large-diameter discharge tubes (151*a*, 151*b*) are inserted so as to protrude from the lower end of the tip portion 144. The small-diameter discharge flow path 136 has a lower end in which a small-diameter discharge tube 152 is inserted so as to protrude from the lower end of the tip portion 144. Herein, the amount of protrusion of each of the discharge tubes (151*a*, 151*b*, 152) from the lower end of the tip portion 144 is set, for example, 1.5 to 3.5 times larger than an inner diameter of the discharge tubes (151, 152). In the configuration illustrated in FIG. 9, the discharge tubes (151*a*, 151*b*, 152) are arranged such that their tip positions are aligned (that is, on a same horizontal plane). However, unlike this, a tip position of the small-diameter discharge tube 152 may be non-aligned with tip positions of the large-diameter discharge tubes (151*a*, 151*b*). For example, in order to adjust the difference between large droplets 402 and a small droplet 403 in time till landing on the application target 401 or in distance to the application target 401 as described with reference to FIG. 4, the amount of protrusion of the small-diameter discharge tube 152 may be smaller or, conversely, larger than those of the large-diameter discharge tubes (151*a*, 151*b*).

Inner diameters of the discharge tubes (151*a*, 151*b*, 152) are preferably the same as inner diameters of the discharge flow paths (135*a*, 135*b*, 136) to provide flow paths each having a uniform diameter without any stepped portion from communication holes (133*a*, 133*b*, 134) of a valve seat 131 to discharge ports (138*a*, 138*b*, 139). The discharge tubes (151*a*, 151*b*, 152) are arranged parallel to one another. The nozzle member 150 is arranged such that central lines of the discharge tubes (151*a*, 151*b*, 152) are aligned with a vertical line for the discharge operation.

In this embodiment, the numbers of the large-diameter discharge tubes 151 and the small-diameter discharge tube 152 are two and one, respectively. But the numbers of large-diameter discharge tubes 151 (and large-diameter discharge ports 138) and small-diameter discharge tubes 152 (and small-diameter discharge ports 139) are not limited thereto, and may be three and two, respectively, or more. For example, as in the variation illustrated in FIG. 6(*a*), the nozzle member 150 may include three large-diameter discharge tubes 151, and two small-diameter discharge tubes 152 each disposed between adjacent two of the large-diameter discharge tubes 151. Alternatively, as in the variation illustrated in FIG. 6(*b*), the nozzle member 150 may include four large-diameter discharge tubes 151, and three small-diameter discharge tubes 152 each disposed between adjacent two of the large-diameter discharge tubes 151. In this case, it is preferable that the plurality of large-diameter discharge tubes 151 (and large-diameter discharge ports 138) have a same diameter, and the plurality of small-diameter discharge tubes 152 (and small-diameter discharge ports 139) have another same diameter. Though the discharge tubes (151, 152) are arranged on a nozzle arrangement line 140, it is not to say that even a slight arrangement deviation of the discharge tubes (151, 152) is unacceptable to achieve the advantageous effects of the present invention. A mode where a plurality of discharge tubes are arranged substantially on a straight line also falls within the technical scope of the present invention.

The discharge device 101 of the second embodiment including the nozzle member 150 configured as described above can also be used to perform application to form unitary linear liquid films 404, specific planar liquid films 405 of various shapes, and a joined planar liquid film 407 of a desired shape as in the first embodiment.

Moreover, the discharge tubes (151, 152) are provided at the lower ends of the discharge flow paths (135, 136) such that the lower ends of the discharge tubes protrude below the tip portion 144 and have no contact with one another. This configuration allows for easy separation of droplets while being discharged, which can prevent extra liquid material from adhering to tip portions of the discharge tubes (151, 152). Furthermore, the easy separation of droplets allows for stable successive discharge with less variations in droplet size or the like. Therefore, according to the discharge device 101 of the second embodiment, it is possible to precisely form a thin wide planar liquid film having less surface unevenness.

According to the present invention, it is possible to reduce the height of surface unevenness of a joined planar liquid film 407 formed of a highly viscous liquid material such as silicon resin, urethane resin, and epoxy resin to one-tenth or less of a film thickness.

Comparison between products by a related art and the present invention using a liquid material with a viscosity of 2500 [mPa·s] was carried out and the following results were obtained. The related art yielded the height or depth of surface unevenness of ±100 [μm] or more with respect to a film thickness of 500 [μm], whereas the present invention achieved the height or depth of surface unevenness of ±50 [μm] or less with respect to the film thickness of 500 [μm]. The present invention is preferable for application of a liquid material having a viscosity of 1000 to 500000 mPa·s, which would be likely to cause unacceptable unevenness in the related art, more preferable for a liquid material having a viscosity of 1500 to 500000 mPa·s, and even more preferable for a liquid material having a viscosity of 2000 to 500000 mPa·s.

LIST OF REFERENCE SYMBOLS

101 discharge device/102 driving unit/103 discharge unit/104 driving unit body/105 discharge unit body/106 piston/107 inner space/108 rod/109 spring chamber/110 air chamber/111 spring/112 stroke adjustment screw/113 lower end of stroke adjustment screw/114 upper end of rod/115 switching valve/116 air supply tube/117 air ejection tube/118 control line/119 seal member (piston)/120 liquid chamber/121 insertion hole/122 seal member (liquid chamber)/123 supply flow path/124 extended portion/125 flow path (extended portion)/126 reservoir/127 adapter tube/128 control device/129 compressed air source/130 nozzle member/131 valve seat/132 nozzle fixture/133 large-diameter communication hole/134 small-diameter communication hole/135 large-diameter discharge flow path/136 small-diameter discharge flow path/137 lower end portion of rod/138 large-diameter discharge port/139 small-diameter discharge port/140 nozzle arrangement line/141 central axis line/142 trunk portion/143 stepped portion/144 tip portion/145 tip-portion first aspect side/146 tip-portion second aspect side/150 nozzle member/151 large-diameter discharge tube/152 small-diameter discharge tube/301 application device/303 XYZ-driving device (relative driving device)/304 X-driving device/305 Y-driving device/306 Z-driving device/307 X-movement direction/308 Y-movement direction/309 Z-movement direction/310 worktable/311 application target/312 housing/313 control device/317 cover/401 application target/402 large droplet/403 small droplet/404 unitary linear liquid film/405 specific planar liquid film/406 discharge device movement direction (application direction)/407 joined planar liquid film/701 application target/702 droplet/703 linear liquid film/704 planar liquid film

The invention claimed is:

1. A planar liquid film forming method of forming a planar liquid film on an application target using a jet-type discharge device having a plurality of discharge ports arranged at a regular interval, wherein the plurality of discharge ports comprising a plurality of large-diameter discharge ports and a small-diameter discharge port arranged halfway between adjacent two of the large-diameter discharge ports, all of the large-diameter discharge ports have a same diameter, the plurality of discharge ports are arranged on a straight nozzle arrangement line, and are arranged with such a distance from one another that globs of a liquid material having landed on the application target can join together to form a linear liquid film, the method comprising:

a unitary linear liquid film forming step of forming a unitary linear liquid film by discharging the liquid material such that a plurality of liquid globs simultaneously discharged from the plurality of discharge ports have no contact with one another before landing on the application target, and by letting globs of the liquid material having landed join together on the application target;

a specific planar liquid film forming step of forming a specific planar liquid film from a plurality of unitary linear liquid films by successively executing the unitary linear liquid film forming steps while moving the jet-type discharge device and the application target relative to each other in a direction perpendicular to the nozzle arrangement line so that the plurality of unitary linear liquid films join together, wherein the unitary linear liquid film forming step includes forming the unitary linear liquid film by causing a small droplet discharged from the small-diameter discharge port to land after a plurality of large droplets discharged from the large-diameter discharge ports landing on the application target due to difference in size between the small droplet and the plurality of large droplets, and wherein the unitary linear liquid film forming step includes discharging the plurality of large droplets so as to form a depressed portion on a surface when the plurality of large droplets join together on the application target, and discharging the small droplet so as to land on the depressed portion.

2. The planar liquid film forming method according to claim 1, comprising a joined planar liquid film forming step of forming a joined planar liquid film from a plurality of specific planar liquid films by executing the specific planar liquid film forming step multiple times to form the plurality of specific planar liquid films adjacent to one another in a direction of the nozzle arrangement line so that the plurality of specific planar liquid films join together.

3. The planar liquid film forming method according to claim 2, wherein the joined planar liquid film forming step includes repeatedly performing a movement of the jet-type discharge device and the application target in a first direction to form a specific planar liquid film and then in a second direction that is opposite to the first direction to form a subsequent specific planar liquid film.

4. The planar liquid film forming method according to claim 2, wherein the joined planar liquid film forming step includes forming the joined planar liquid film by letting differently shaped specific planar liquid films join together.

5. The planar liquid film forming method according to claim 2, wherein the joined planar liquid film has surface unevenness with a height of one-tenth or less of a thickness of the joined planar liquid film.

6. The planar liquid film forming method according to claim 1, wherein the diameter of the large-diameter discharge ports is 1.2 to 2 times larger than a diameter of the small-diameter discharge port.

7. The planar liquid film forming method according to claim 6, wherein the large-diameter discharge ports are arranged at a regular interval, and a distance between adjacent two of the large-diameter discharge ports is 2 to 12 times larger than the diameter of the large-diameter discharge ports.

8. The planar liquid film forming method according to claim 1, wherein the liquid material has a viscosity of 1000 mPa's or larger.

9. The planar liquid film forming method according to claim 1, wherein the plurality of discharge ports include:

three large-diameter discharge ports; and two small-diameter discharge ports arranged respectively halfway between adjacent two of the large-diameter discharge ports, wherein all of the two small-diameter discharge ports have a same diameter.

10. The planar liquid film forming method according to claim 1, wherein the plurality of discharge ports include:

four large-diameter discharge ports; and three small-diameter discharge ports arranged respectively halfway between adjacent two of the large-diameter discharge ports, wherein all of the three small-diameter discharge ports have a same diameter.

* * * * *